Patented Aug. 11, 1953

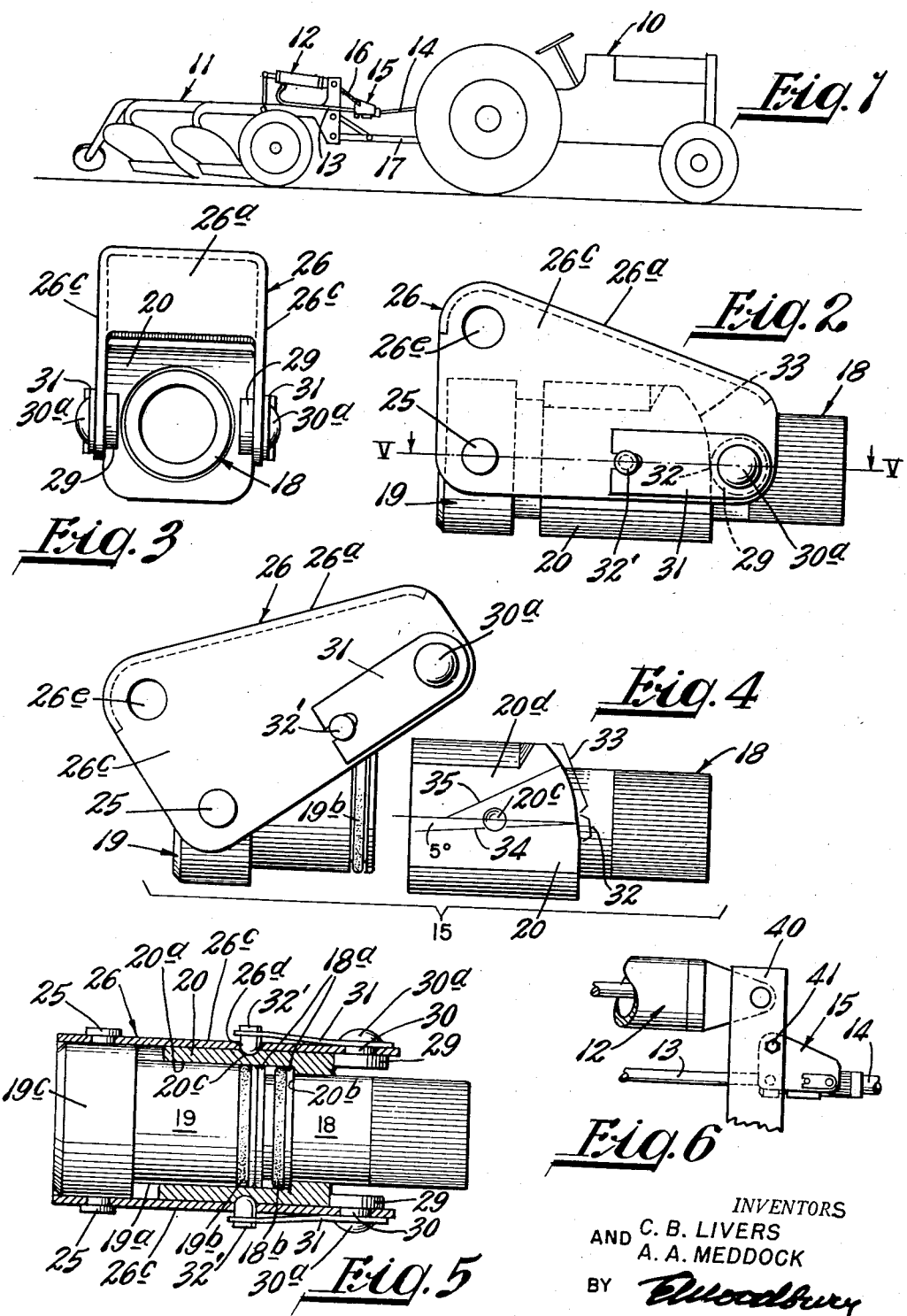

2,648,552

UNITED STATES PATENT OFFICE 2,648,552

RETAINER MECHANISM FOR QUICK DISCONNECT COUPLING

Carlos B. Livers, North Hollywood, and Alvin A. Meddock, Van Nuys, Calif., assignors to Bendix Aviation Corporation, South Bend, Ind., a corporation of Delaware Application August 3, 1949, Serial No. 108,294

3 Claims. (Cl. 285—172)

This invention relates to quick disconnect couplings for use particularly in flexible line or hose connections in which two fittings are in fluid coupling relation with each other when pressed firmly together, the present invention residing in particular in the mechanism for holding such fittings together.

An object of the invention is to provide a coupling mechanism of the type referred to that can be readily manipulated to force the fittings together and retain them in that position, and can also be readily manipulated to disengage the fittings when it is desired to break the connection.

Another object is to provide a retaining mechanism of the type referred to that is inexpensive, substantially incapable of getting out of order, and rugged in nature, so that it is capable of withstanding rough handling.

Other more specific objects and features of the invention will become apparent from the description to follow of a particular embodiment thereof with reference to the drawing, in which:

Fig. 1 is a side elevational view showing an automatically releasable coupling incorporating the invention, in a hydraulic hose line extending between a tractor and a drawn plow.

Fig. 2 is a side elevational view of a coupling incorporating the invention, in coupled position.

Fig. 3 is an end elevation looking at the right end of Fig. 2.

Fig. 4 is a side elevational view similar to Fig. 2 but showing the retaining mechanism in open position and the coupling fittings separated.

Fig. 5 is a horizontal section in the plane V—V of Fig. 2; and

Fig. 6 is a detailed side elevation showing a mode of mounting the coupling alternative to that shown in Fig. 1.

Referring first to Fig. 1, there is shown a tractor 10 drawing a plow 11 through a drawbar 17. The plow is equipped with a hydraulic lift actuated by a hydraulic jack 12, which is actuated by pressure fluid supplied by a pump (not shown) on the tractor 10 through a hose line consisting of a hose 13 that is permanently connected to the plow 11, and a hose 14 that is permanently connected to the tractor 10, the hoses 13 and 14 being interconnected by a quick disconnect coupling 15 in accordance with the present invention. The coupling 15 is shown mechanically connected to the plow 11 by a cable 16, and, as will appear later, the arrangement is such that if the drawbar connection 17 between the plow and the tractor is broken, and the latter moved away from the plow, the resulting tension applied to the coupling 15 by the cable 10 and the hose 14 causes the couping to disconnect.

As best shown in Fig. 5, the coupling 15 comprises a pair of fittings 18 and 19 which are adapted to be pressed together and maintained together by a retainer mechanism which is the subject matter of this invention. The two fittings 18 and 19 are sealed with respect to each other by a sleeve 20 having a cylindrical inner surface 20a that slideably fits an external surface 19a on the fitting 19, and the peripheral surfaces of a pair of flanges 18a on the fitting 18. An O ring 18b of rubber-like material, mounted between the flanges 18a on the fitting 18, seals with the inner surface 20a of the sleeve 20. A similar O ring 19b is mounted in a groove provided therefor in the surface 19a of the fitting 19, and seals with the inner surface 20a of the sleeve 20.

The fittings 18 and 19 may be of the type containing valves which are normally closed when the fittings are separated, to prevent fluid leakage from the lines, but which open when the fittings are pressed together to establish fluid connection therebetween. Such a valve is shown in the copending application Serial No. 67,625, filed December 28, 1948, by A. A. Meddock, and the retaining mechanism of the present invention is especially designed for use with fittings as disclosed in said prior application. However, since the present invention resides solely in the retaining mechanism, and the latter is not limited in its used to the condition where the fittings 18 and 19 contain self-closing valves, the latter are not disclosed herein.

The fitting 19 has an enlarged annular head 19c at its rear end to which the hose 13 (Fig. 1) is connected in any known manner. This enlarged shoulder 19c has hingedly secured thereto, by a pair of trunnions 25, a latch 26, so that the latch is capable of swinging about an axis extending transversely of the fitting 19. The sleeve 20 normally constitutes a part of the fitting 18, having an internal shoulder 20b which engages the rearmost annular flange 18a on the fitting 18. The latch 26 in turn is adapted to engage the sleeve 20 and hold it in such position with respect to the head 19c that the inner ends of the fittings 18 and 19 are pressed together.

Referring to Figs. 2, 3 and 4, the latch 26 consists of a channel member having a base 26a and a pair of flanges 26c which extend parallel to each other and are of such width as to receive therebetween the head 19c of the fitting 19, as shown in Fig. 5. At their right ends the flanges 26c carry a pair of cam followers 29 which engage a pair of cam surfaces on the sleeve element 20 in a manner to be described. These cam followers 29 are shown as rollers secured to the inner faces of the flanges 26c by rivets 30. The heads 30a of the rivets 30 also retain leaf springs 31 which carry on their other ends detents 32' slideably positioned in apertures 26d in the latch flanges 26c. These detents 32' snap into recesses 20c in the sleeve 20 to yieldably retain the latch in closed position.

Referring to Figs. 3 and 4, the outer surface of the sleeve 20 is generally rectangular in cross section, and has parallel opposite side faces 20d containing the detent recesses 20c previously referred to. The rear ends of these side faces 20d terminate in curved cam surfaces along which the cam followers 29 of the latch move during opening and closing movement of the latch. Each cam has a final portion 32, approximately perpendicular to the longitudinal axis of the fitting 18, against which its associated cam follower 29 rests when the latch is in closed position, and an approach portion 33 over which the follower moves into and out of the final position.

The latch 26 has, extending through the flanges 26c at a point adjacent the base 26a, a pair of apertures 26e adapted to be engaged with the cable 16 of Fig. 1 to apply an opening force to the latch when the coupling is to be broken. These apertures 26e are substantially opposite the trunnions 25 so that in response to tension between the cable 16 and the hose 14 (Fig. 1), a torque is developed to rotate the latch 26 about the trunnions 25 from the closed position shown in Fig. 2 into the open position shown in Fig. 4.

This opening movement can be facilitated by inclining the cam surface portions 32 so that a perpendicular (normal) line 34 (Fig. 4) drawn from this portion of the cam face is displaced approximately 5 degrees from a radius 35 drawn from the axis of the trunnion 25 to the cam portion 32. By virtue of this slight displacement of the normal (the line 34) of the cam portion 32 from the radius 35, normal separating force between the fittings 18 and 19 produced by pressure fluid therewithin produces a slight opening force component on the latch 26. However, this component is readily overcome and controlled by the resistance to opening offered by the spring detents 32' when the latch is in fully closed position. Tension applied to the apertures 26e with respect to the fitting 18 readily overcomes the holding resistance afforded by the detents 32', and after the detents have released, the latch snaps quickly into the open position shown in Fig. 4, this opening being aided by the pressure force between the fittings acting, through the approach portion of the cam 33, against the cam followers 29.

As is clearly apparent from inspection of Fig. 4, the approach portions 33 have relatively sharp curvature, so that the two fittings 18 and 19 move apart as the followers 29 move off these portions. Contrariwise, connection of the coupling, even with some pressure within the fittings, can be readily accomplished by forcing the latch 26 into closed position and thereby causing the followers 29 to cam the fittings together as they move over the approach portions 33 into the final portions 32 of the cam.

Various ways can be employed of so anchoring the latch 26 at the apertures 26e as to release the coupling in response to tension between the fitting 18 and the latch. One alternative method is illustrated in Fig. 6 in which the latch is secured to an upright 40 on the plow by means of a bolt 41 extended through the apertures 26e in the latch and the cooperating aperture in the upright 40. The bolt 41 is not tightened sufficiently to prevent the latch from rotating freely thereabout. When tension is applied to the hose 14, the coupling is disconnected in the manner already described.

Although for the purpose of explaining the invention, a particular embodiment thereof has been shown and described, obvious modifications will occur to a person skilled in the art, and I do not desire to be limited to the exact details shown and described.

We claim:

1. In a coupling comprising a pair of fluid conducting fittings adapted to complete a fluid flow path therebetween when pressed together, means for detachably securing said fittings together comprising: a pair of latch-engaging shoulders on opposite sides of one fitting facing away from the other fitting; a latch hingedly secured to said other fitting for swinging movement about a hinge axis extending transversely of the fitting and having a pair of shoulder-engaging elements adapted to engage and ride along said shoulders during such swinging movement; said shoulders being of substantial length relative to said elements that ride therealong, and each shoulder having a final portion on which one of said elements rests in fully latched position, and an approach portion over which said element rides during swinging movement of the latch into and out of fully latched position, said final portion being in approximately longitudinal alignment with said latch axis and approximately tangent to a radius therefrom to said axis, said shoulder being progressively increasingly spaced from said axis along said approach portion to said final portion whereby movement of said latch into fully latched position continually draws said fittings together, and detent means independent of said shoulder and said latch elements for yieldably retaining said latch on said final portion of said shoulder; said latch comprising a pair of parallel wall members on opposite sides of said other fittings; said shoulder-engaging elements comprising rollers on the inner sides of said wall members; roller-supporting rivets extending through said wall members and having heads on the outside of said members; and said detent means comprising an aperture in one of said wall members, a detent slidable in said aperture, a recess in said one fitting aligned with said detent in fully latched position of said latch, and a leaf spring anchored at one end to said one wall member by the rivet in that member, the other end of said leaf spring engaging said detent and urging it inwardly to yieldably engage it in said recess.

2. In a coupling comprising a pair of fluid conducting fittings adapted to complete a fluid flow path therebetween when pressed together, means for detachably securing said fittings together comprising: a pair of latch-engaging shoulders on opposite sides of one fitting facing away from the other fitting; a latch hingedly secured to said other fitting for swinging movement about a hinge axis extending transversely of the fitting and having a pair of shoulder-engaging elements adapted to engage and ride along said shoulders during such swinging movement; said shoulders being of substantial length relative to said elements that ride therealong, and each shoulder having a final portion on which one of said elements rests in latched position, and an approach portion over which said element rides during swinging movement of the latch into and out of latched position, said final portion being in approximately longitudinal alignment with said latch axis and approximately tangent to a radius therefrom to said axis, said shoulders being progressively increasingly spaced from said axis along said approach portion to and in said final portion whereby movement of said latch into latched position continually draws said fittings together; and detent means independent of said shoulders and said latch elements for yieldably retaining said latch in said latched position, said detent means being constituted by portions of said one fitting and said latch respectively which portions have surfaces perpendicular to said hinge axis and closely spaced in juxtaposed relation to each other in said latched position, one of said portions having an aperture therein; a detent element positioned in said aperture and guided thereby for movement parallel to said hinge axis toward and away from said other portion; said other portion having a recess juxtaposed to said detent element in said latched position; and spring means urging said detent element in projecting relation from said aperture into said recess; at least said recess or the part of said detent element projecting thereinto having a surface so angularly disposed as to cam said detent element out of said recess against the force of said spring means in response to movement of said latch out of latched position.

3. A coupling according to claim 2 in which said final portion of said shoulder is slightly inclined from said tangent in the same direction that the approach portion is inclined.

CARLOS B. LIVERS.
ALVIN A. MEDDOCK.

References Cited in the file of this patent

UNITED STATES PATENTS

| Number | Name | Date |
| --- | --- | --- |
| 810,584 | Sutton | Jan. 23, 1906 |
| 996,079 | Greenlund | June 27, 1911 |
| 1,148,913 | McClellan | Aug. 3, 1915 |
| 1,481,392 | Schawrow | Jan. 22, 1924 |
| 1,482,722 | Armstrong | Feb. 5, 1924 |
| 1,926,949 | Kennedy | Sept. 12, 1933 |
| 2,221,492 | Sawyer | Nov. 12, 1940 |
| 2,494,774 | Messick | Jan. 17, 1950 |

FOREIGN PATENTS

| Number | Country | Date |
| --- | --- | --- |
| 692,800 | Germany | June 27, 1940 |